United States Patent [19]

Lim et al.

[11] Patent Number: 5,248,510
[45] Date of Patent: Sep. 28, 1993

[54] COBALT OXIDE PASSIVATION OF NICKEL BATTERY ELECTRODE SUBSTRATES

[75] Inventors: Hong S. Lim, Agora Hills; David F. Pickett, Rancho Palos Verdes; Gabriela R. Zelter, West Hollywood, all of Calif.

[73] Assignee: Hughes Aircraft Company, Los Angeles, Calif.

[21] Appl. No.: 836,498

[22] Filed: Feb. 18, 1992

[51] Int. Cl.$^5$ .............................................. H01M 4/66
[52] U.S. Cl. ................................... 429/236; 429/245; 427/419.3
[58] Field of Search ..................... 429/235, 236, 245; 427/126.6, 419.3

[56] References Cited

U.S. PATENT DOCUMENTS 2,646,456  7/1953  Jacquier ............................. 429/236
4,119,771  10/1978  Saridakis ......................... 429/235 X
4,251,603  2/1981  Matsumoto et al. ........... 429/235 X Primary Examiner—Stephen Kalafut
Attorney, Agent, or Firm—Terje Gudmestad; Elizabeth E. Leitereg; W. K. Denson-Low

[57] ABSTRACT

A nickel electrode (14) for use in a storage cell (10) includes a porous nickel substrate (50, 52) and a cobalt oxide passivation layer (56) on the nickel substrate (50, 52). A mass of nickel hydroxide/oxide (54) is impregnated within the pores of the substrate (50, 52). The cobalt oxide layer (56) is preferably deposited on the nickel substrate (50, 52) by contacting the substrate (50, 52) with an aqueous solution of cobalt nitrate, removing the excess solution, and heating the substrate in an oxygen-containing environment to form cobalt oxide. The cobalt oxide layer (56) at the surface of the substrate (50, 52) acts as a passivation layer to prevent corrosion of the nickel substrate (50, 52).

16 Claims, 3 Drawing Sheets

COBALT OXIDE PASSIVATION OF NICKEL BATTERY ELECTRODE SUBSTRATES

BACKGROUND OF THE INVENTION

This invention relates to electrical storage cells, and, more particularly, to a corrosion-resistant nickel electrode used in such cells.

Rechargeable cells or batteries are electrochemical devices for storing and retaining an electrical charge and later delivering that charge as useful power. A familiar example of the rechargeable cell is the nickel-cadmium cell used in various portable electronic devices such as cameras and radios. Another type of cell having a greater storage capacity for its weight is the nickel-hydrogen cell. The nickel-hydrogen cell is used in spacecraft such as satellites to store power generated by solar cells when the spacecraft is in sunlight, and discharged to supply power when the spacecraft is in darkness.

These storage cells utilize a nickel positive electrode, a negative electrode, and an electrolyte as the basic charge-storing element. For example, the nickel-hydrogen cell includes a series of active plate sets, each plate set having a nickel/nickel oxide positive electrode (termed a "nickel electrode"), a hydrogen negative electrode, a separator between the electrodes, and an electrolyte such as a potassium hydroxide solution. A stack of the plate sets are packaged within a pressure vessel that contains the stack, the electrolyte, and the hydrogen gas evolved and consumed during the charge/discharge cycle of the cell. A nickel-hydrogen storage cell has an open circuit voltage of about 1.3 volts, and a number of the cells are usually connected in series to provide the voltage required by the systems of the spacecraft.

The nickel electrode is manufactured by impregnating a porous nickel substrate with nickel oxide. The nickel substrate is corroded in the aqueous impregnation solution, which is acidic. The corrosion reduces the utilization of the nickel oxide active material and the cyclic life of the nickel electrode and thence the life of the cell. Since a storage cell in a commercial satellite may be required to operate for periods of time of 15 years or more without any maintenance, reduction of the cyclic life due to corrosion of the storage cell is a serious concern.

There have been several approaches to reducing corrosion of the nickel substrate during manufacture of the nickel electrode. One technique is to use an alcohol-based impregnation bath, but this approach, used presently, may be unacceptable in the future in large-scale manufacturing operations due to environmental concerns. Another approach is to use an aqueous impregnation bath, but to inhibit corrosion of the nickel substrate of the nickel electrode by passivating the nickel substrate. The passivation is accomplished by dampening the substrate with water and heating it in air to a temperature of about 350° C. A nickel oxide film forms on the surface of the nickel substrate, and the passivating film is somewhat effective in reducing corrosion.

However, these approaches have not been entirely successful, and there exists a need for an improved approach to preventing corrosion of the nickel substrate portion of the nickel electrode during impregnation of the nickel oxide into the porous nickel substrate and during service of the storage cell. The present invention fulfills this need, and further provides related advantages.

SUMMARY OF THE INVENTION

The present approach provides a nickel electrode, a storage cell using a nickel electrode, and a method for their manufacture. The corrosion of the nickel substrate is avoided or at least greatly reduced, thereby increasing the life and reliability of the storage cell. The approach of the invention is readily incorporated into the electrode manufacturing process, with little added cost and without the need to modify the design or structure of the nickel electrode.

In accordance with the invention, an electrical storage cell comprises a nickel positive electrode having a porous nickel substrate and nickel oxide active material and cobalt oxide impregnated within the pores of the substrate, and a cobalt oxide passivation layer on the nickel substrate. The storage cell further includes a negative electrode, a separator between the electrodes, an electrolyte, and a vessel enclosing the positive electrode, the negative electrode, the separator, and the electrolyte.

It has been found that the corrosion of the nickel substrate portion of the nickel electrode is substantially eliminated by passivating the surface with a cobalt oxide surface layer. The cobalt oxide layer is insoluble in the mildly acidic aqueous solution used in the subsequent nickel oxide impregnating step. Consequently, the cobalt oxide layer protects the nickel substrate to eliminate or at least substantially reduce the corrosion of the nickel substrate by the impregnating solution.

The cobalt oxide layer can be applied by any suitable technique. A preferred approach is to soak the porous nickel substrate in an aqueous cobalt nitrate solution, remove the excess solution, and then convert the cobalt nitrate to cobalt oxide by heating in air. This solution-based technique achieves complete coating of the nickel substrate, even though the substrate has surface irregularities and porosities.

The cobalt oxide-coated nickel substrate is thereafter impregnated with nickel oxide active material in the conventional manner, and assembled with the other elements to form a plate set.

The present invention provides a significant advance in the art of storage cells that utilize a nickel substrate in at least one of the electrodes. Other features and advantages of the invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
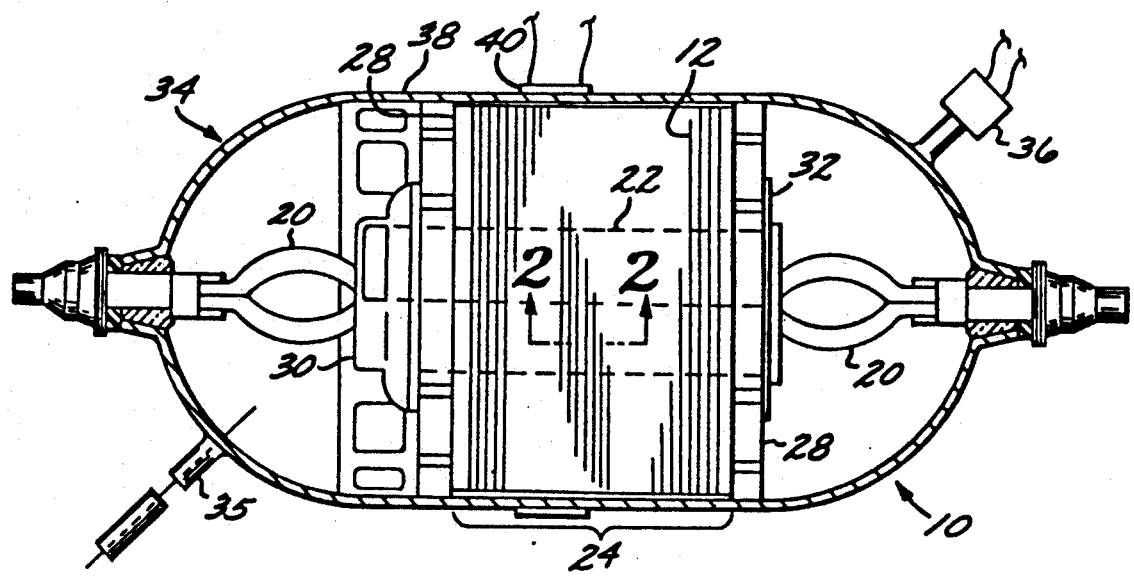
FIG. 1 is a sectional elevational view of a flight-type nickel-hydrogen cell.
Figure 2:
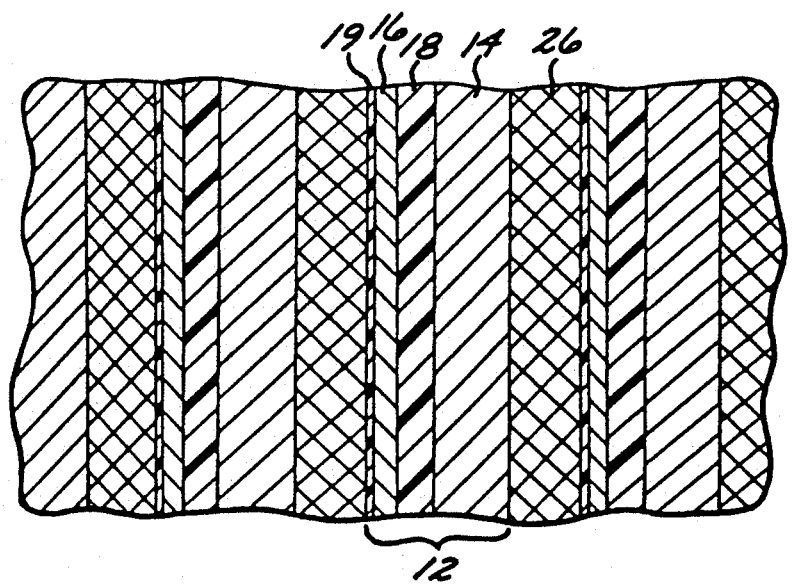
FIG. 2 is a enlarged sectional view of a detail of FIG. 1, taken generally on line 2—2, illustrating the plate sets.

The present invention is preferably used in conjunction with a nickel-hydrogen storage cell 10, as illustrated in FIGS. 1 and 2, of the pressurized gas-metal cell type. Such a cell 10 typically comprises a plurality of individual plate sets 12. Each plate set 12 in turn comprises an cathode or positive electrode 14, a anode or negative electrode 16, and an electrolyte-containing separator 18, which physically separates the electrodes 14 and 16, and also supplies the electrolyte medium through which ionic and electron transfer occur. Charging and discharging of the plate set 12 are accomplished through electrical leads 20.

Various constructions of nickel-hydrogen cells and components are disclosed in the following U.S. patents, whose disclosures are herein incorporated by reference: U.S. Pat. Nos. 4,820,597; 4,283,844; 4,262,061; 4,250,235; 4,000,350; and 3,669,744.

The positive or nickel electrode 14 is formed by impregnating nickel oxide into a porous sintered substrate, and the complete process will be discussed in greater detail subsequently. The negative electrode 16 is coated on one side by a sintered mixture of platinum black and polytetrafluoroethylene, and on the other side with a porous layer of polytetrafluoroethylene 19. These layers are applied to a nickel substrate in the form of etched sheet or a woven mesh, to form the negative electrode 16. Many different types of separators 18 have been used, including, for example, asbestos, nylon, and a cloth of zirconium oxide-yttrium oxide. The electrolyte, typically a 26-31 percent aqueous solution of potassium hydroxide, is impregnated into the separator 18 in this flight-type cell.

The individual plate sets 12 are assembled onto a central core 22 to form a stacked array 24. In forming the stacked array 24, a monofilament polypropylene screen 26 is placed between each plate set 12, so that hydrogen evolved at the negative electrode 14 during normal charging, and oxygen liberated during overcharging at the nickel electrode 14, can diffuse away from the electrode 14 and to the negative electrode 16 to combine with hydrogen. The stacked array 24 is placed under a longitudinal pressure of, for example, about 10 pounds per square inch, by tightening compression plates 28 against each end of the stacked array 24. The tightening of the compression plates 28 is preferably accomplished by compressing the array 24 and then tightening a nut 30 on threads on the core 22, thereby compressing a Belleville washer set 32 against the compression plate 28 to hold the stacked array 24 in place.

The stacked array 24 is sealed within a pressure vessel 34, manufactured of a material such as Inconel 718 nickel-based alloy which can withstand internal pressures on the order of 1,000 psi, without damage by hydrogen embrittlement or corrosion by the electrolyte. A gas fill tube 35 allows gas content and pressure within the pressure 34 to be controlled, if necessary. The pressure vessel 34 is typically constructed in the form of a cylindrical tube having domed ends. By way of illustration, the cell 10 having the pressure vessel 34 of external dimensions 3½ inches diameter and 13 inches long can contain about 40 individual plate sets 12, with a resulting electrical storage capacity of the cell of about 50 ampere-hours. The cell 10 may be charged and discharged through thousands of cycles without apparent physical damage to the components, if the charging and discharging are accomplished properly. A number of cells 10 are typically combined a series and parallel arrangements to produce a battery with the required voltage and current delivery characteristics.

Charging is accomplished by passing a dc current through the leads 20 across each plate set 12 so that electrons flow from the electrode 16 to the electrode 14. Electrical energy is thereby stored in each plate set in the form of chemical reactants, for subsequent discharging to produce a usable current. A nickel-hydrogen cell of the type described previously may be fully charged by a solar cell array to a capacity of, for example, about 50 ampere hours, using a current of about 5 amperes at 1.5 volts, through a charging period of about 14 hours from a discharged state. The voltage and charging time vary, depending upon the power available from the solar cell and the cycle dictated by the orbit of the spacecraft.

The cell is normally instrumented to monitor its operational state. As the nickel-hydrogen cell 10 is charged, hydrogen is evolved, and the pressure within the sealed pressure vessel 34 increases. The rise in pressure may be measured directly by a pressure transducer 36, which measures the pressure within the pressure vessel 34. Alternatively, the rise in pressure may also be deduced by measuring a quantity which responds to pressure, specifically the deformation in the wall 38 of the pressure vessel 34. That is, as the pressure within the pressure vessel 34 increases, the pressure vessel tends to expand and bulge slightly. A strain gauge 40 fastened to the wall 38 of the pressure vessel 34 measures the bulging of the wall, which is a function of, and preferably proportional to, the internal gas pressure within the vessel 34.

Figure 3:
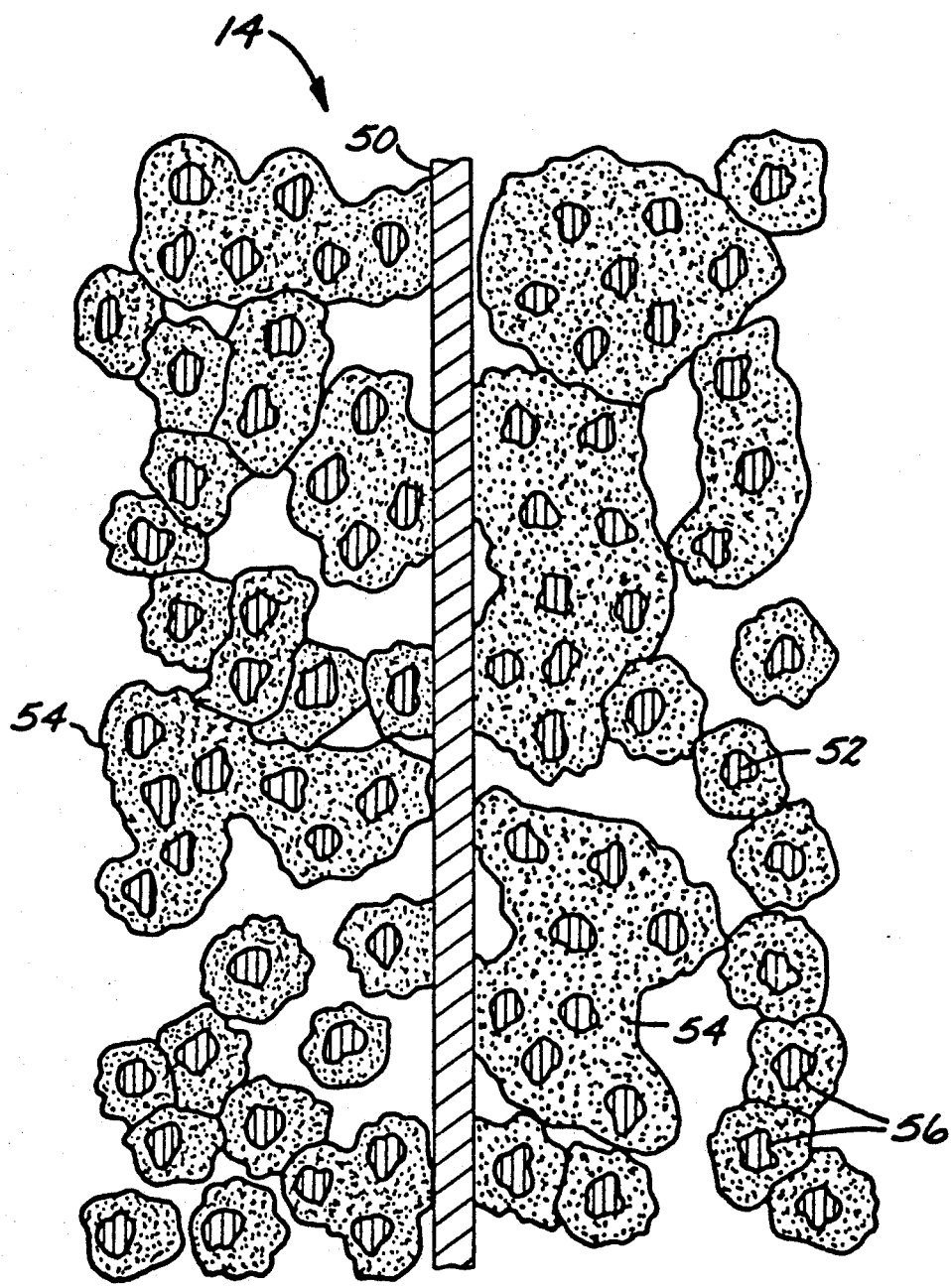
FIG. 3 is a schematic illustration of the details of the nickel electrode of the invention.

The structure of the nickel electrode 14 is shown in greater detail in FIG. 3. The nickel electrode 14 includes a sintered mat of nickel particles 52, which by itself has sufficient structural strength that it may be handled with care. The nickel particles 52 have diameters of from about 2 to about 4 micrometers and are sintered to a nickel screen 50. The mat has an effective porosity of about 80 percent.

There are other designs and configurations for the porous support that have been utilized and are possible, having different porosities up to about 95 percent. The present invention is not limited to any particular design of the support or porosity, although its beneficial effects are most significant for structures of high porosity.

The resulting structure of sintered nickel particles 52 and the nickel screen 50 is collectively termed the "nickel substrate".

The nickel substrate of nickel fibers 50 and particles 52 is coated with a cobalt oxide layer 56. The cobalt oxide layer 56 is normally quite thin, and is preferably on the order of from about 0.1 to about 0.5 micrometers thick.

The cobalt oxide layer 56 is preferably applied to the nickel fibers 50 and particles 52 by soaking the nickel substrate in an aqueous solution of about 1 molar cobalt nitrate, draining the solution, and blotting away the remaining excess solution with absorbent sheets. The nickel substrate is then heated in an oxygen-containing atmosphere, preferably air, to a temperature sufficient to convert the cobalt nitrate to cobalt oxide. The heat treatment is preferably at a temperature of from about 300 C. to about 400 C. for a period of about 15 to about 30 minutes. The resulting cobalt oxide layer 56 passivates the nickel fibers 50 and particles 52 against corrosion.

A corrosion test of plaque samples passivated by the cobalt oxide layer and one passivated by a standard procedure was carried out by heating the samples for two hours in a simulated impregnation bath solution containing 0.5 molar nitrite and 0.5 molar sodium nitrate. The weight decrease from the initial weight, in percent, for the cobalt-oxide coated sample was negligible and for the conventionally passivated sample was 1 percent.

Impregnated within the porosity is a mass of active material 54, which is nickel hydroxide/oxide preferably doped with from about 6 to about 10 weight percent cobalt. The cobalt oxide-coated substrate is placed into an aqueous solution containing 50 percent alcohol, 1.8 moles per liter nickel nitrate, 0.2 moles per liter cobalt nitrate, and 0.03 to 1.0 molar sodium nitrate, at a pH of about 3 to 4 at a temperature of about 100 C. The cobalt oxide layer on the nickel screen 50 and nickel particles 52 protect them from corrosion in this mildly acidic environment. Cobalt-doped nickel oxide deposits into and is impregnated within the interstices of the nickel fibers and the nickel particles that form the nickel substrate. The nickel oxide impregnated nickel substrate is the positive or nickel electrode 14.

Figure 4:
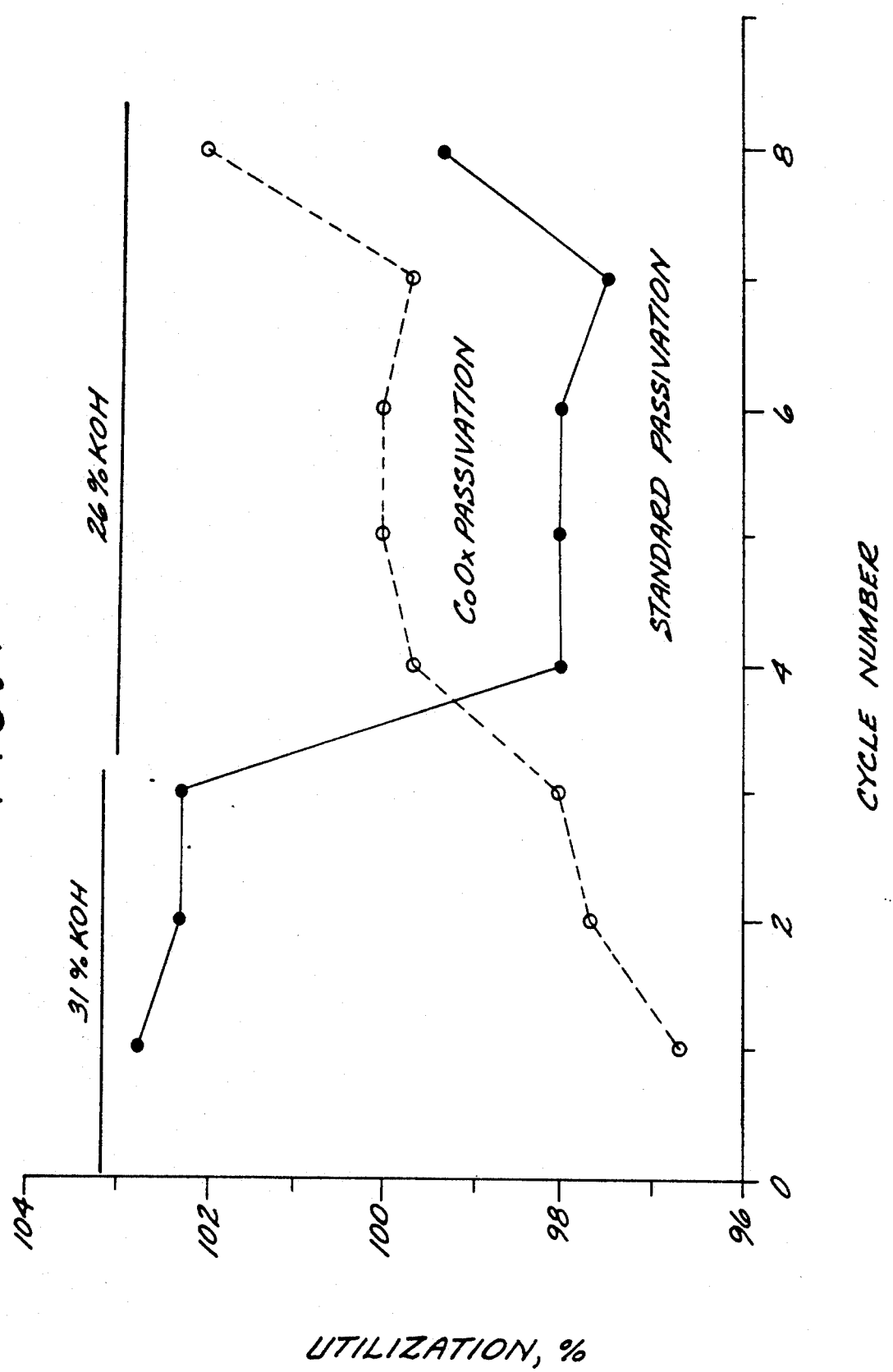
FIG. 4 is a graphical illustration of the percent utilization of the present invention compared to standard passivation for two potassium hydroxide concentrations.

Nickel electrodes using a plaque passivated by the cobalt oxide coating had the additional advantage of higher active material utilization than achieved by those using the standard passivation technique. To determine the relative performance, four electrodes of each kind were prepared using the standard impregnation procedure. Active material utilization of each electrode was determined by measuring capacity in an electrolyte-flooded cell containing 31 percent potassium hydroxide solution initially, which was changed to 26 percent potassium hydroxide solution after three successive measurements. The electrodes were charged at a ten-hour rate (C/10 rate) for 18 hours and discharged at a two-hour rate (C/2 rate) to $-1.0$ volt against a nickel sheet counter electrode to measure the capacity. Utilization was calculated from the capacity and weight gain during the impregnation of the electrode assuming that all weight gain is due to nickel hydroxide and that there is only one electron transfer involved per nickel atom during discharge of the electrode. Average utilizations for the two different types of electrodes for the two different potassium hydroxide concentrations are shown in FIG. 4. The nickel electrodes using a plaque passivated by the cobalt oxide coating showed a higher value of utilization than the conventional type in 26 percent potassium hydroxide solution although the utilization in the 31 percent potassium hydroxide solution was lower. For a long-life application of the nickel-hydrogen cell, 26 percent potassium hydroxide solution is superior to 31 percent potassium hydroxide solution as an electrolyte. The present invention improves performance in the preferred electrolyte.

The present approach provides an improved nickel electrode and nickel electrode-containing storage cell. Although a particular embodiment of the invention has been described in detail for purposes of illustration, various modifications may be made without departing from the spirit and scope of the invention. Accordingly, the invention is not to be limited except as by the appended claims.

What is claimed is:
1. An electrical storage cell, comprising:
   a nickel positive electrode which comprises
      a porous nickel substrate, and
      a nickel hydroxide/oxide active material doped with cobalt, the active material being impregnated within the pores of the nickel substrate;
   a cobalt oxide passivation layer on the nickel substrate;
   a negative electrode;
   a separator between the electrodes;
   an electrolyte; and
   a vessel enclosing the positive electrode, the negative electrode, the separator, and the electrolyte.
2. The storage cell of claim 1, wherein the nickel substrate includes sintered nickel particles.
3. The storage cell of claim 1, wherein the nickel substrate includes a mat of sintered nickel fibers.
4. The storage cell of claim 1, wherein the nickel substrate includes a mat of nickel particles and nickel fibers.
5. The storage cell of claim 1, wherein the negative electrode is a hydrogen electrode.
6. The storage cell of claim 1, wherein the negative electrode is a cadmium electrode.
7. The storage cell of claim 1, wherein the vessel is sealed.
8. A nickel electrode for use in a storage cell, comprising:
   a porous nickel substrate;
   a cobalt oxide passivation layer on the nickel substrate; and
   a mass of nickel hydroxide/oxide impregnated within the pores of the substrate.
9. The electrode of claim 8, wherein the nickel substrate includes sintered nickel particles.
10. The electrode of claim 8, wherein the nickel substrate includes a mat of sintered nickel fibers.
11. The electrode of claim 8, wherein the nickel substrate includes a mat of nickel particles and nickel fibers.
12. A process for preparing a nickel electrode for use in a storage cell, comprising the steps of:
    furnishing a porous nickel substrate;
    contacting the nickel substrate with an aqueous solution containing cobalt nitrate;
    removing excess solution from the nickel substrate;
    heating the substrate in an oxygen-containing atmosphere to a temperature sufficient to react the cobalt nitrate to form cobalt oxide at the surface of the substrate; and
    impregnating nickel hydroxide/oxide active material into the pores of the substrate.
13. The process of claim 12, wherein the nickel substrate includes sintered nickel particles.
14. The process of claim 12, wherein the nickel substrate includes a mat of sintered nickel fibers.
15. The process of claim 12, wherein the nickel substrate includes a mate of nickel particles and nickel fibers.
16. The process of claim 12, wherein in the step of heating the electrode is heated to a temperature of from about 300 C. to about 400 C. for a period of from about 15 to about 30 minutes.

* * * * *